R. HOLMAN.
CHAIN FASTENER.
APPLICATION FILED MAY 28, 1912.
1,051,230.
Patented Jan. 21, 1913.
2 SHEETS—SHEET 1.
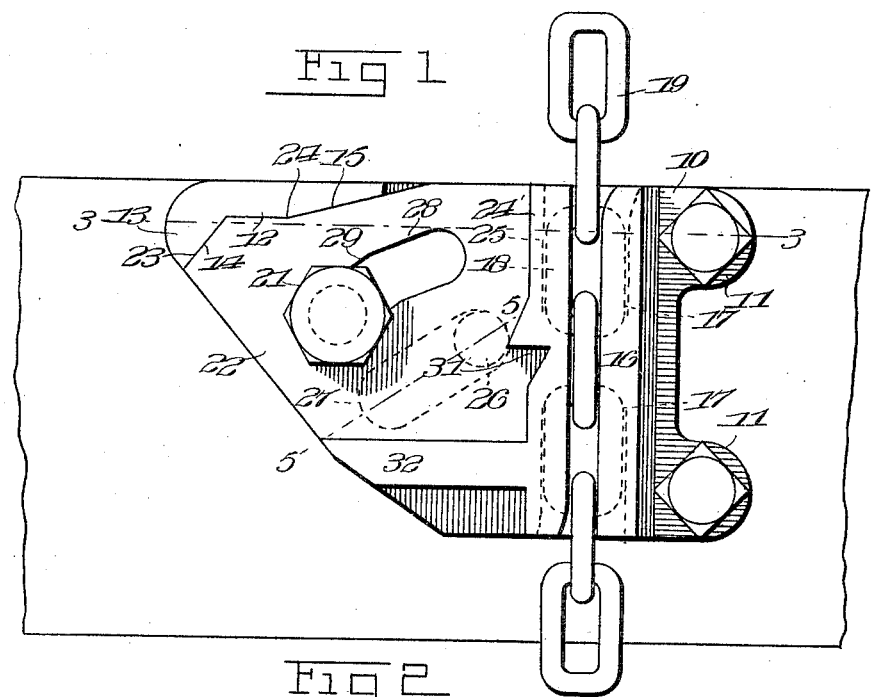
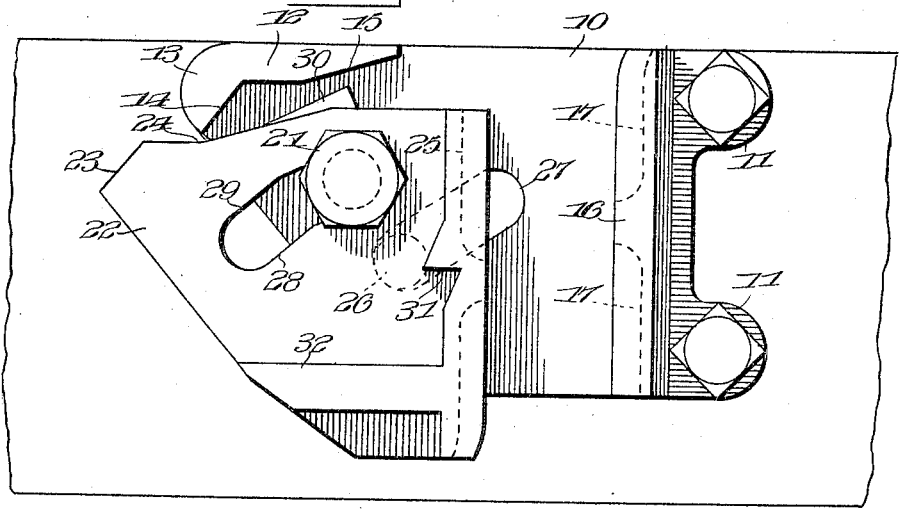
Inventor
Rudolph Holman
Witnesses
By Victor J. Evans
Attorney R. HOLMAN.
CHAIN FASTENER.
APPLICATION FILED MAY 28, 1912.
1,051,230.
Patented Jan. 21, 1913.
2 SHEETS—SHEET 2.
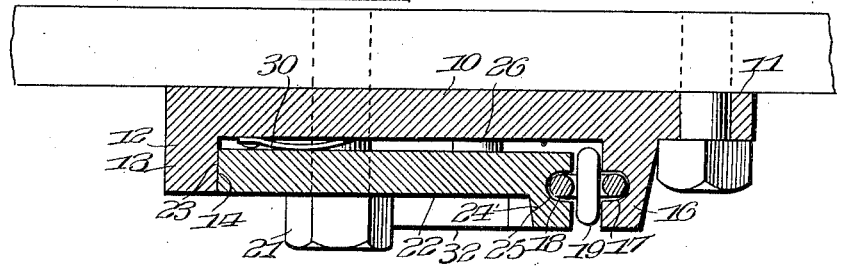
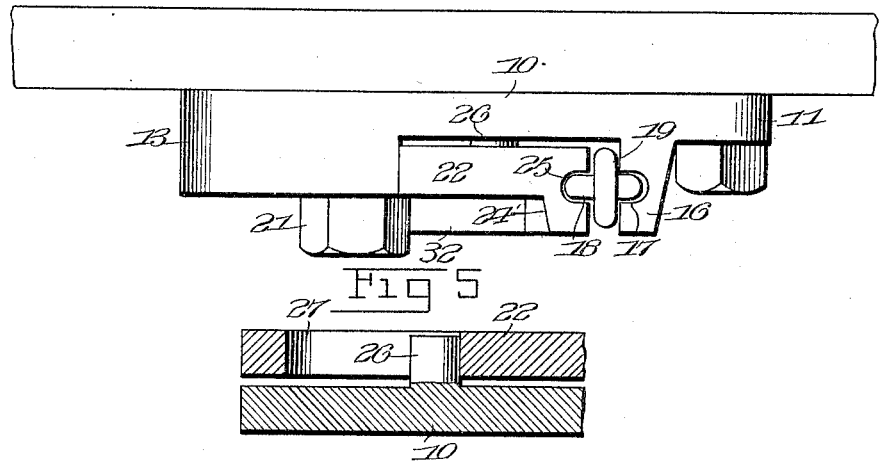
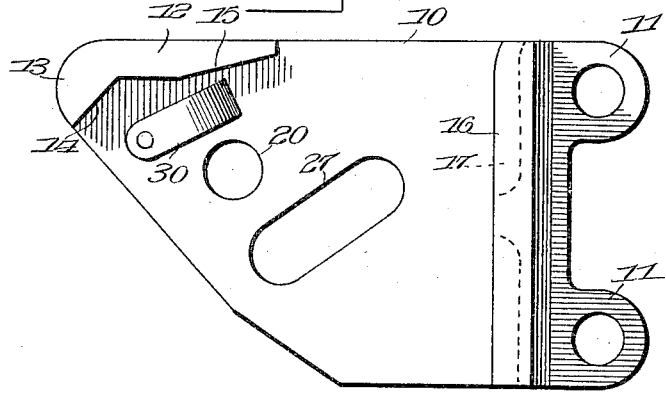
Inventor
Rudolph Holman
Witnesses
By Victor J. Evans
Attorney

UNITED STATES PATENT OFFICE.

RUDOLPH HOLMAN, OF MONROE, LOUISIANA.

CHAIN-FASTENER.

1,051,230. Specification of Letters Patent. Patented Jan. 21, 1913.

Application filed May 28, 1912. Serial No. 700,317.

*To all whom it may concern:*

Be it known that I, RUDOLPH HOLMAN, a citizen of the United States, residing at Monroe, in the parish of Ouachita and State of Louisiana, have invented new and useful Improvements in Chain-Fasteners, of which the following is a specification.

The invention relates to chain fasteners, and more particularly to the class of lock chain grapples.

The primary object of the invention is the provision of a device of this character wherein a chain can be securely held so as to avoid slipping thereof or the loosening of the same when supporting a load, the device being specially adapted for mounting on log cars, wagons, or other vehicles, whereby the load of material when chained will not fall therefrom or become lost during transit.

Another object of the invention is the provision of a device of this character in which the chain when fastened can be readily and easily released by the operator when beneath the vehicle, so as to avoid the possibility of an accident by the falling of the load on to such operator which might occur should the latter be standing at the side of the vehicle.

A further object of the invention is the provision of a device of this character in which chains having different sized links can be firmly clamped and securely held in adjusted position as the occasion may require.

A still further object of the invention is the provision of a device of this character which is simple in construction, readily and easily operated, automatic in action for positively gripping the chain, and also which may be manufactured at a minimum expense.

With these and other objects in view the invention consists in the construction, combination and arrangement of parts as will be hereinafter more fully described, illustrated in the accompanying drawings, and pointed out in the claims hereunto appended.

In the drawings:—Figure 1 is a side elevation of a device constructed in accordance with the invention, showing a chain gripped and held fast therein. Fig. 2 is a similar view showing the device in releasing position. Fig. 3 is a sectional view on the line 3—3 of Fig. 1. Fig. 4 is an edge elevation. Fig. 5 is a sectional view on the line 5—5 of Fig. 1. Fig. 6 is a plan view of the base or stationary plate with the top or movable plate detached therefrom.

Similar reference characters indicate corresponding parts throughout the several views in the drawings.

Referring to the drawings by numerals the device comprises a stationary base plate 10, the same being of substantially rectangular shape and is preferably constructed from metal, formed at the larger end with spaced perforated eyes 11 through which are passed suitable bolt members or other fasteners for securing the said plate to the side, of a car, wagon, or other vehicle, while formed at the opposite or smaller end of the said plate and projecting outwardly from the outer face thereof is an abutment flange 12 provided with a downwardly extending nose 13 having a beveled inner edge 14, the inner edge of the flange 12 being formed with a beveled portion 15 and this flange and nose is for a purpose presently described.

Formed on the outer face of the plate 10 at right angles to the flange 12 spaced a considerable distance therefrom is a rib or cleat extension 16, which extends entirely across said plate 10 transversely thereof, and has formed in one side spaced elongated pockets or recesses 17, adapted to receive portions of a pair of links 18 of a chain 19, which is ordinarily used for the retention and holding of logs or other material upon cars, wagons, or the like. The plate 10 spaced from the flange 12 or nose 13 is formed with an opening 20 through which is passed a fastener 21 in the form of a bolt member which is designed to perform a dual function, namely assisting in fastening the plate 10 to the car, vehicle or the like, and also for the mounting of the movable locking member presently described, on the said plate 10.

The locking member comprises a movable top plate 22, the same being of corresponding shape with respect to the plate 10, but of less size than the same, and is preferably constructed from metal. The plate 22 is formed at its smaller edge with a beveled surface 23, while the uppermost edge is cut away at 24 corresponding to the flange 12 for accommodating the same, so that when the plate 22 is superimposed or is located in juxtaposition with respect to the plate 10 the beveled surface 23 will coact with the beveled edge 14 of the nose 13 on the flange 12 to force the plate 22 in a direction toward the rib or cleat extension 16, the edge of the plate 22 adjacent said rib or cleat extension 16 being formed with a corresponding rib or cleat extension 24, to coact therewith, and is provided with elongated pockets or recesses 25 therein receiving the pair of links 18 engaged in the recesses 17, the said latter recesses and the recesses 25 being designed to register with each other on the bringing together of the cleat extensions 16 and 24, and in this manner the chain 18 is securely locked therebetween.

Formed on the plate 22 and projecting inwardly therefrom is a guide lug 26, which is adapted to engage in a guide slot 27, formed in the plate 10 when the said movable plate is connected therewith. By using the guide lug 26 in this way the fastener could be reversed so the plate 22 will drop into the stationary plate 10 and lock the chain 19 by gravity. By using the fastener in this position spring 30 could be eliminated, and to release the fastener the prize bar would have to be pulled upward.

The plate 22 is formed with elongated slot 28 having an annular branch 29 and through this slot is passed the fastener 21 so that the plate 22 can be moved on the plate 10 for the locking and unlocking of the chain 18 when placed between the rib or cleat extensions thereon.

Suitably fixed on the plate 10 and acting against the plate 22 when mounted thereon is an outwardly bowed leaf spring 30, which frictionally binds the movable plate 22, so as to hold the same against dropping downwardly in releasing position when the chain is fastened in the device.

Formed on the rib or cleat extension 24 in the outer edge thereof is a V-shaped notch 31, while spaced therefrom and projecting outwardly from the outer face of said plate is a bearing extension 32 and adapted to engage in the notch 31 and against said bearing extension 32 is an ordinary prize bar or tool which enables the said plate 22 to be moved to releasing position. By reason of the disposition of the notch 31, the bearing extension 32, the said prize bar can be manipulated in a convenient manner by an operator when positioned beneath the car body, vehicle or the like, thereby avoiding the possibility of the load falling upon such operator when releasing the chain.

It will be evident that on an upward pull upon the chain when engaged in the pockets or recesses in the rib or cleat extensions 16 and 24 of the said plates, the outer plate 22 will be forced in a direction so as to firmly and positively grip the chain by reason of the working of the beveled surface 23 of the beveled edge 14 of the nose 13 formed on the base plate, so that there will be no possibility of the chain becoming accidentally loosened or freed from the device.

When it is desired to release the chain 19 the plate 22 is moved by the use of the prize bar or other tool the latter being engaged in the notch 31 and against the bearing 32 and it is only necessary to pull downwardly upon the bar whereupon the movable plate 22 will be shifted to move its rib or cleat extension 24 away from the rib or cleat extension 16 upon the base plate 10, thus freeing the chain and permitting it to slip in the device.

From the foregoing description taken in connection with the accompanying drawings, it is thought that the construction and operation of the invention will be clearly understood, and therefore, a more extended explanation has been omitted.

What is claimed is:—

1. A chain grab comprising stationary and movable members, means connecting the movable member to said stationary member, socketed chain receiving ribs formed on the said members, a beveled nose rising from the stationary member, a beveled edge formed on the movable member and engageable with the beveled nose for causing the said movable member to be moved in one direction for bringing together the said ribs on both members, the said movable member being provided with a tool receiving notch and a flange formed on the movable member spaced from said notch to serve as the bearing for such tool whereby the movable member can be moved to releasing position.

2. A chain grab comprising stationary and movable members, means connecting the movable member to said stationary member, socketed chain receiving ribs formed on the said members, a beveled nose rising from the stationary member, a beveled edge formed on the movable member and engageable with the beveled nose for causing the said movable member to be moved in one direction for bringing together the said ribs on both members, the said movable member being provided with a tool receiving notch and a flange formed on the movable member spaced from said notch to serve as the bearing for such tool whereby the movable member can be moved to releasing position, and ear extensions formed on the stationary member and adapted to receive fasteners for connecting it to a body.

3. A chain grab comprising stationary and movable members, means connecting the movable member to said stationary member, socketed chain receiving ribs formed on the said members, a beveled nose rising from the stationary member, a beveled edge formed on the movable member and engageable with the beveled nose for causing the said movable member to be moved in one direction for bringing together the said ribs on both members the said movable member being provided with a tool receiving notch and a flange formed on the movable member spaced from said notch to serve as the bearing for such tool whereby the movable member can be moved to releasing position, and ear extensions formed on the stationary member and adapted to receive fasteners for connecting it to a body, and the guide lug on movable plate which works in elongated slot in stationary plate which holds the recesses of both plates in line and at the same time is used for fulcrum in releasing chain.

In testimony whereof I affix my signature in presence of two witnesses.

RUDOLPH HOLMAN.

Witnesses:
R. E. CHAMBERS,
E. W. LUTTRELL.

Copies of this patent may be obtained for five cents each, by addressing the "Commissioner of Patents, Washington, D. C."